Feb. 5, 1946.     C. D. PETERSON ET AL     2,394,099
TRANSMISSION MECHANISM (BALKING RING CLUTCH ASSEMBLY)
Filed Sept. 29, 1943     2 Sheets-Sheet 1
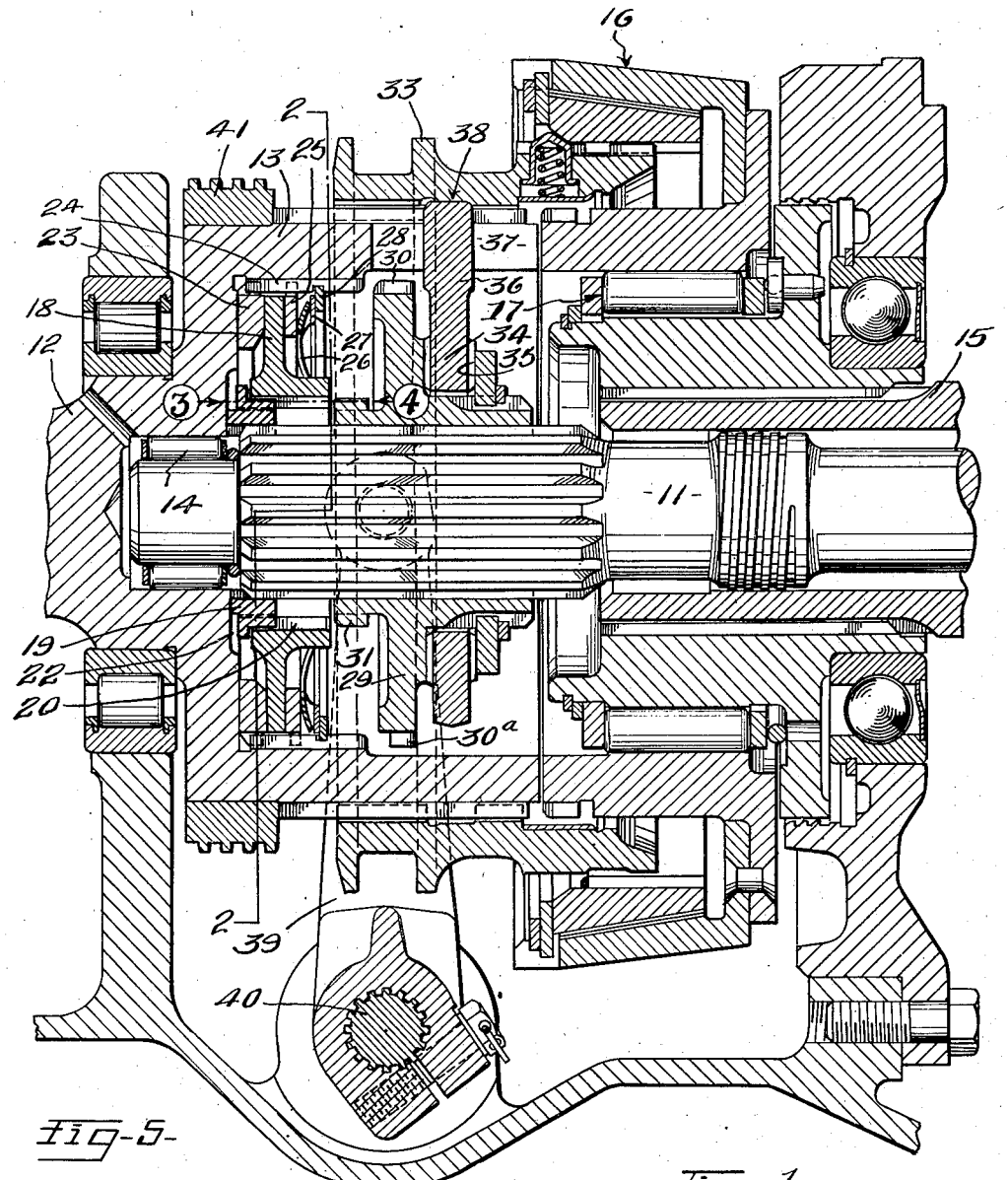
Fig-1-
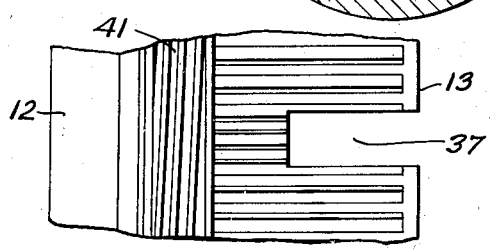
Fig-5-
INVENTORS.
Carl D. Peterson + Albert H. Deimel
BY
Bedell & Thompson
ATTORNEYS.

Feb. 5, 1946.      C. D. PETERSON ET AL      2,394,099
TRANSMISSION MECHANISM (BALKING RING CLUTCH ASSEMBLY)
Filed Sept. 29, 1943      2 Sheets-Sheet 2
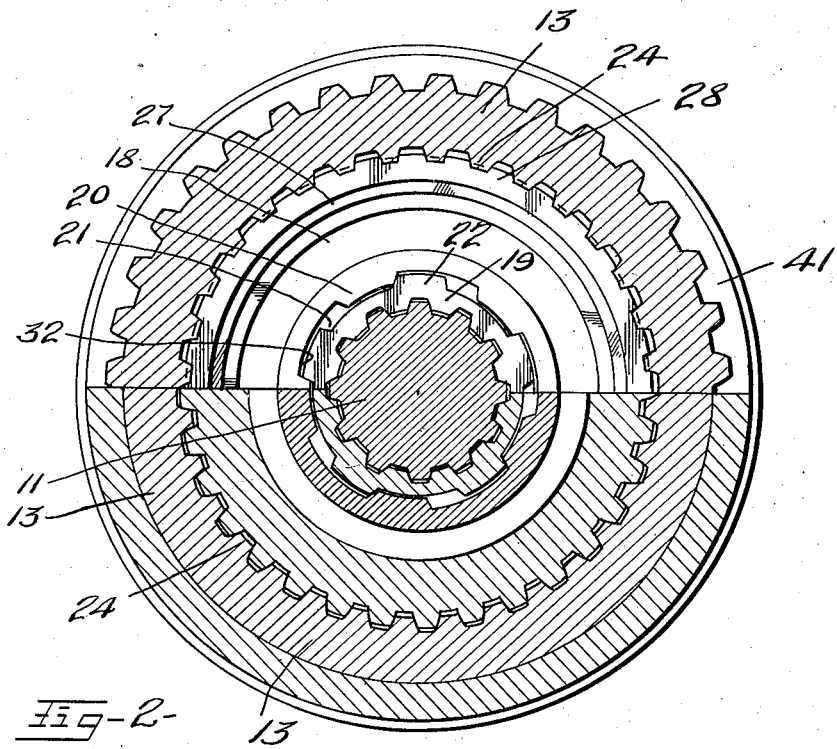
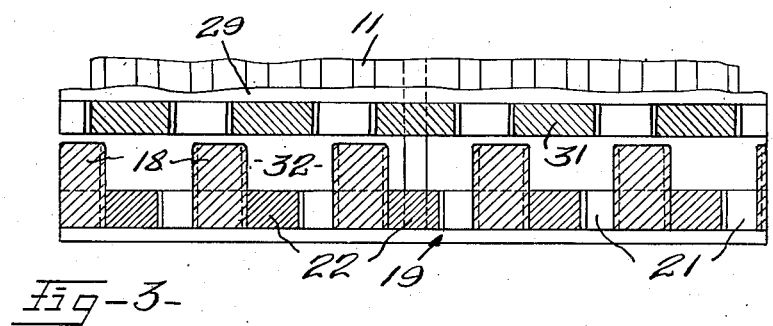
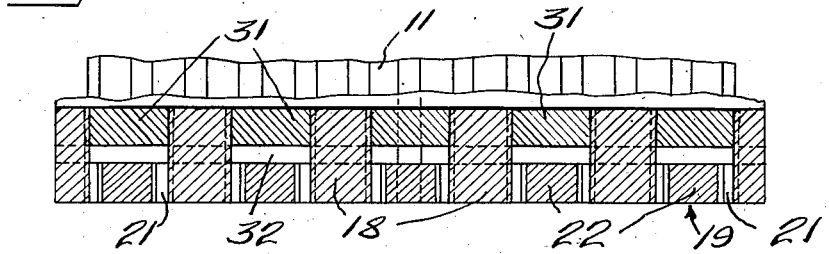

Patented Feb. 5, 1946

2,394,099

UNITED STATES PATENT OFFICE 2,394,099

TRANSMISSION MECHANISM (BALKING RING CLUTCH ASSEMBLY)

Carl D. Peterson and Albert H. Deimel, Toledo, Ohio

Application September 29, 1943, Serial No. 504,232

4 Claims. (Cl. 192—53)

This invention relates to transmission mechanisms which include clutches, as balking ring clutches, and has for its object a particularly simple, compact, easily assembled elements or shafts and the relative arrangement of the operating means for the clutch.

The invention consists in the novel features and in the combinations and constructions hereinafter set forth and claimed.

In describing this invention, reference is had to the accompanying drawings in which like characters designate corresponding parts in all the views.

Figure 1 is a fragmentary sectional view of a transmission mechanism embodying this invention.

Figure 2 is a sectional view on line 2—2, Figure 1.

Figures 3 and 4 are diagrammatic sectional views showing the co-operation of the teeth of the balking ring and the balking teeth of the shiftable clutch member taken on line 3—4, Figure 1.

Figure 5 is a fragmentary view of the head of the driven shaft looking radially at the periphery thereof.

This transmission mechanism includes, generally, driving and driven shafts, one of which has a cylindrical head formed with a recess opening through its end face, the other shaft extending axially into the recess and having a bearing in the former shaft and a ring clutch between the shafts located in the recess and including a shiftable section slidable axially of said other shaft, and a shifting collar mounted on the head and connected to the shiftable section. It further includes the arrangement of parts of the clutch within the head, as a balking ring, the collar on the inner shaft and on which the balking ring is mounted, the friction ring with which the balking ring coacts, the spring means holding the balking ring and friction ring in contact and the lock ring in the head holding said parts from displacement.

11 and 12 designate the driving and driven shafts respectively, and in the illustrated embodiment of the invention, the driven shaft is formed with a cylindrical head 13, and the driving shaft extends axially into the head and is journalled at one end at 14 in the shaft 12. This balking ring clutch is shown as embodied in a transmission mechanism which also includes another driving shaft 15 which is an elongated hub or sleeve on the output turbine of a hydraulic torque converter, which is actuated through a clutch by the same engine that actuates the shaft 11, both shafts 11 and 15 being actuated at the same time, but the shaft 15 being driven through the slipping action of the hydraulic torque converter. The shaft 15 is connected to the shaft 12 through a synchronizing clutch 16, the driving member of which is actuated from the shaft or sleeve 15 through an overrunning clutch designated, generally 17. In so far as this invention is concerned, the shaft 12 may be the drive shaft and the shafts 11 and 15 the driven shafts. However, the shaft 15 and the synchronizing clutch 16 form no part of this invention.

This invention relates to the assembly of the balking ring clutch in the head 13 and the operation thereof by a collar on the head 13, as hereinafter described.

18 designates the balking ring, this having a hub mounted on a collar 19 splined on the shaft 11 to have a limited rocking movement relatively thereto, the balking ring or the hub thereof having internal teeth 20 extending into the spaces 21 between teeth 22 on the collar, the teeth 20 being of less width than the spaces 21 to permit the relative rocking movement of the balking ring 18. The collar 19 is located in the recess of the hollow head 13 and thrusts against the bottom thereof and is held from axial displacement thereby. This is a feature facilitating the assembling, as will be hereinafter referred to. The balking ring extends between a friction ring 23 which thrusts against the bottom of the recess and which has teeth interlocked with the internal splines 24 of a cylindrical wall of the head 13, and a washer 25 having teeth interlocked with said splines 24. The balking ring is spring-loaded or thrusts in an axial direction against the friction ring 23 in any suitable manner, as by a spring 26 interposed between the washer 25 and another washer 27, which thrusts against a lock ring 28 interlocked in internal notches formed in the splines 24. The spring is thus interposed between the head 13 and the balking ring and thrusts the balking ring into engagement with the friction ring 23.

29 designates a shiftable clutch section having a hub splined on the shaft 11 and shiftable axially thereof, this clutch section 29 having peripheral clutch teeth 30 for coacting with the outer ends of the splines 24 of the head 13, the teeth 30 being alternately long and short, as shown at 30 and 30a (Figure 1). The shiftable clutch section 29 is also provided with peripheral blocking teeth 31 on the hub thereof, these being of substantially the same width as the spaces 32 between the internal teeth 20 of the balking ring, so as to fit said spaces with a sliding fit. When the speeds of the driving and driven shafts are different, the teeth 31 and the internal teeth 18 will occupy a position analogous to that shown in Figure 3, wherein they are out of alinement and will abut against each other at their corners and thus block shifting of the clutch teeth 30 into engagement with the ends of the splines 24. As the speeds of the driving and driven shafts cross, the parts will move into position analogous to that shown in Figure 4, wherein the blocking teeth 31 aline with the spaces 22 and the shifting in can be completed. The confronting ends of the internal teeth 18 of the balking ring and the blocking teeth 31 of the shiftable clutch section 29 are preferably unbevelled or flat.

33 designates a collar shiftable on the head 13, this being connected to the clutch section 29 by an annular yoke or spider 34 working in a groove 35 in the hub of the section 29 and having radially outwardly extending arms 36 extending through lengthwise slots 37 in the head 13 and anchored in any suitable manner at 38 at their outer ends to the collar, so that shifting of the collar axially shifts the clutch section 29. The collar 33 is also a clutch collar, that is, it is splined on the outer peripheral surface of the head 13 and also serves as a part of the synchronizing clutch 16 and is operable to engage the synchronizing clutch 16. The collar 33 is operated by a suitable yoke 39 mounted on the shaft 40, which in turn is operated in any suitable manner.

41 designates a gear mounted on the head 13 to operate some instrumentality, as a speedometer or governor and the like, and is of no consequence in so far as this invention is concerned.

In assembling the balking ring clutch, the parts thereof including the collar 19, clutch section 29, can be mounted on the splines of the shaft 11, and these parts then slid into the head 13 along with the balking ring 18 on the collar and the friction ring 23, washer 25, spring 26, outer washer 27, and then the parts locked in position by the lock snap ring 28. Because of this arrangement, the balking ring clutch is particularly compact internally within the head 13 and operated by a collar 33 on the outside of the head, which may also be used to operate another clutch, as the synchronizing clutch 16. Obviously, when the collar is shifted in one direction, as to the left, it engages the balking ring clutch, and in the other direction from neutral, as to the right, the synchronizing clutch, and this operation forms no part of this invention.

What we claim is:

1. The combination of driving and driven shafts, one of the shafts having a head formed with an axial cylindrical recess, the other shaft extending coaxially into the recess, and a clutch operable to clutch the shafts together located in the recess and including a shiftable section on the other of said shafts, and a shifting collar on the head and operatively connected to the shiftable section.

2. The combination of driving and driven shafts, one of the shafts having a head formed with an axial cylindrical recess, the other shaft extending coaxially into the recess, a clutch operable to clutch the shafts together located in the recess and including a shiftable section on the other of said shafts, a shifting collar slidable on the head, and a yoke connecting the collar and the shiftable section including radial arms extending through the cylindrical wall of the head and connected to the collar, the head having lengthwise slots through which the radial arms extend.

3. In a transmission mechanism including a balking ring clutch, the combination of driving and driven shafts, one of the shafts having a head formed with an axial cylindrical recess, the cylindrical walls of which are formed with splines, the other shaft extending coaxially into the recess, a sliding toothed clutch section splined on said other shaft and having clutch teeth shiftable into and out of engagement with the ends of the splines of said head, the clutch section also having a hub provided with blocking teeth, a collar splined on said other shaft and coacting with the bottom of said recess and held thereby from axial displacement, the collar having peripheral teeth, a thrust friction ring in the recess thrusting against the bottom thereof and having teeth interlocked with the splines of the head, a balking ring having a hub formed with internal teeth interlocked with the teeth of the collar and mounted to have a limited rocking movement relatively to the collar, the spaces between the internal teeth of the balking ring being of substantially the same width as the blocking teeth of the shiftable clutch section and the blocking teeth coacting with the ends of the internal teeth of the balking ring, when the speeds are differential and being brought into alinement with said spaces as the speeds cross, and spring means located to thrust the balking ring into frictional engagement with the friction ring, the spring means thrusting in opposite directions against the said head and the balking ring.

4. In a transmission mechanism including a balking ring clutch, the combination of driving and driven shafts, one of the shafts having a head formed with an axial cylindrical recess, the cylindrical walls of which are formed with splines, the other shaft extending coaxially into the recess, a sliding toothed clutch section splined on said other shaft and having clutch teeth shiftable into and out of engagement with the ends of the splines of said head, the clutch section also having a hub provided with blocking teeth, a collar splined on said other shaft and coacting with the bottom of said recess and held thereby from axial displacement, the collar having peripheral teeth, a thrust friction ring in the recess thrusting against the bottom thereof and having teeth interlocked with the splines of the head, a balking ring having a hub formed with internal teeth interlocked with the teeth of the collar and mounted to have a limited rocking movement relatively to the collar, the spaces between the internal teeth of the balking ring being of substantially the same width as the blocking teeth of the shiftable clutch section and the blocking teeth coacting with the ends of the internal teeth of the balking ring, when the speeds are differential and being brought into alinement with said spaces as the speeds cross, spring means located to thrust the balking ring into frictional engagement with the friction ring, and a collar slidable on the head and connected to the shiftable clutch section to shift the same.

CARL D. PETERSON.
ALBERT H. DEIMEL.